July 28, 1931.  J. E. B. MAILLARD  1,816,383
DISTRIBUTOR FOR PULVERULENT AND PASTY PRODUCTS
Filed Aug. 19, 1930  2 Sheets-Sheet 1

J. E. B. Maillard
INVENTOR

July 28, 1931. J. E. B. MAILLARD 1,816,383
DISTRIBUTOR FOR PULVERULENT AND PASTY PRODUCTS
Filed Aug. 19, 1930 2 Sheets-Sheet 2
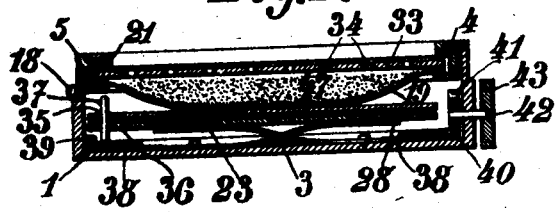
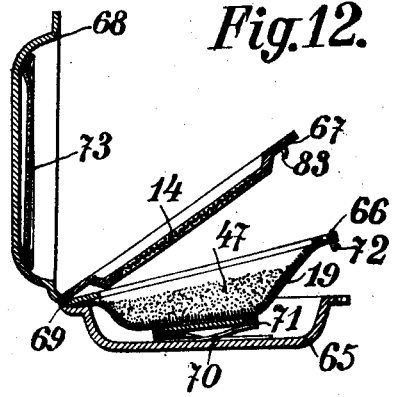
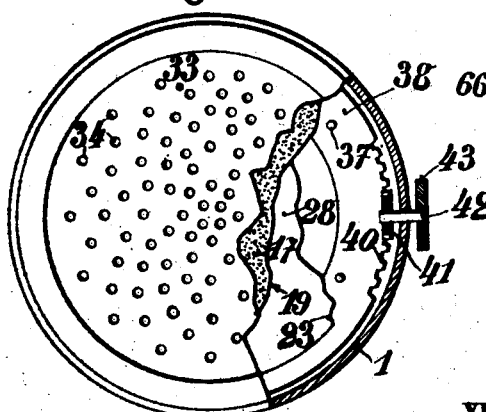
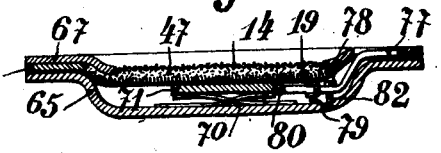
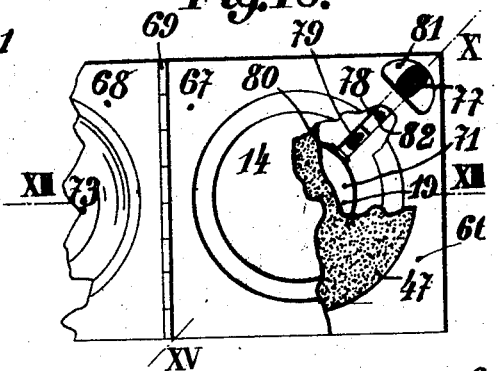
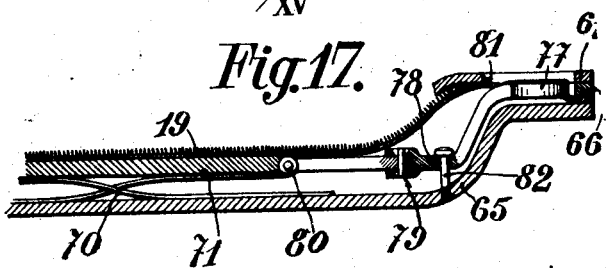
J. E. B. Maillard
INVENTOR Patented July 28, 1931

1,816,383

UNITED STATES PATENT OFFICE

JOSEPH, EUGÉNE, BAPTISTE MAILLARD, OF NOGENT-LE-ROI, FRANCE

DISTRIBUTOR FOR PULVERULENT AND PASTY PRODUCTS

Application filed August 19, 1930, Serial No. 476,371, and in France September 2, 1929.

The present invention has for object a distributor having the shape of a capsule provided with a supple tight bottom at the rear and a sieve at the front; the distribution of the product is insured, either by the movableness of the sieve, according to a rotating, reciprocating to oscillating movement, or by the movableness of the supple tight bottom.

The tight bottom is made of a supple, unsmooth material, chamois skin for instance, or a fine nappy twilled fabric, in order that the powder may press and adhere on the sieve, and be scraped by the latter, without following its movement, as, if the powder was freely drawn along by the sieve, its distribution would be very much reduced and often null.

The capsules can be inserted in suitable boxes, in which the sieve is set in motion by means of a powder puff, or the movement is imparted to the supple bottom, by a knob arranged outside the box.

Interchangeable and nonrefillable capsules avoid any manipulation and loss of powder and prevent the box from being filled up with any powder other than that of the capsules.

The invention further consists in a system of refillable case or box, the sieve-carrying frame of which is hingedly mounted; the powder is pushed by a spring arranged under the tight bottom.

For pasty products, the tight bottom is made of a rubber sheet, or of gold beater's skin.

A rotary, reciprocating or oscillating movement can be imparted to the supple bottom of the case or box by means of a movable double bottom secured in position under the box.

The use of these capsules ensures absolute tightness, any leakage of powder being impossible through the movable bottom; the distribution of the product can take place only through the sieve, covered with a puff, and only when a movement is imparted to the sieve, either by means of the puff or by and other device.

The invention has also for object capsules in the form of a puff for distributing the powder on the user's face.

The above mentioned details particularly relate to rice powder, face paint, but this distributor is also applicable to the distribution of talc, pharmaceutical and beauty products and any pulverulent and pasty materials.

The accompanying drawings illustrate, by way of example, various forms of carrying out the subject-matter of the invention.

Fig. 7 is a vertical section of a box enclosing a powder capsule, the supple bottom of which receives a reciprocating movement by means of an operating knob arranged outside the box.

Fig. 8 is a top plan view of the box in open position, with parts broken away to show the inside arrangement.

Fig. 12 is a vertical section of a case enclosing a refillable capsule, the sieve of which is fitted in a frame hingedly mounted; the section is taken on line XII—XII of the Fig. 16.

Fig. 13 is a vertical section of a fastener.

Fig. 14 is an underside plan view of the fastener.

Fig. 15 is a vertical section of a portion of the case, showing the system of lever imparting to the supple bottom of the capsule a movement determining the issue of the powder; the section is taken on line XV—XV of the Fig. 16.

Fig. 16 is a top plan view of the sieve-carrying frame, with a part broken away showing the interior of the capsule and the operating lever.

Fig. 17 is a vertical section, made on an enlarged scale, of the system of operating lever.

Figure 1:
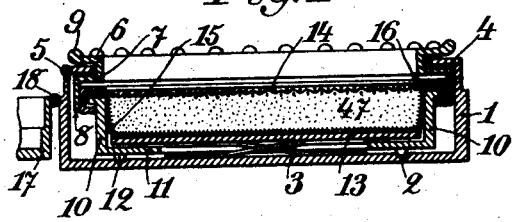
Fig. 1 is a vertical section of a box enclosing an interchangeable powder capsule.

The interchangeable capsule, which cannot be refilled once used (Fig. 11), is composed of a capsule body 10, the centrally apertured bottom 11 of which is provided with projecting parts 12; the upper edge extends outwardly so as to retain a movable ring 16 carrying a movable sieve 14; the lower part of this ring is, after the capsule has been filled up, bent down under the upper edge of the latter, but without clamping it, so as to allow easy rotation of the ring.

The sieve 14, made of cotton or silk fabric, wire gauze, etc., is tightly stretched under the upper part of the ring 16, so as to be driven with the same during its rotary movement.

Within the capsule 10 is arranged a push-plate 13, which is rendered tight by a lining made of skin or fluid-tight fabric 15, the edges of which are raised and secured to the upper part of the capsule 10, so as to allow the push-plate 13 to rise under the pressure of a spring 3, arranged in the bottom of the box 1.

The box 1 is composed of a body 1, in the bottom of which are provided hollows 2 adapted to receive the projecting portions or bosses 12, and of the spring 3, secured to the bottom of the box and which pushes the plate 13.

The upper part of the box carries a frame 4, hingedly mounted at 5, and another movable frame 6 surrounds the frame 4 by its bent down portion 7; the vertical portion 8 forms an inner ring, in which the movable ring 16 is tightly fitted, in order that this ring 16 may be driven by the movable frame 6, when the latter is actuated by the ball-like portions 9 which are gripped by the fingers.

For placing the capsule 10 in position, or for removing it, it suffices to open the hinged frame 4.

The box is closed by means of a cover 17, provided with a hinge 18.

Figure 3:
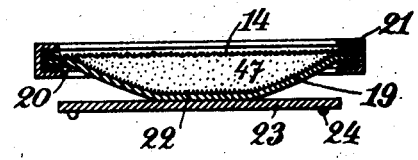
Fig. 3 is a vertical section of an interchangeable capsule, provided with a supple bottom and a sieve-top.

Fig. 3 illustrates a capsule, having a supple bottom 19 and a frame 20, containing the powder and closed by the cloth sieve 14 which is secured in position by a beaded ring 21.

The middle portion 22 of the supple bottom 19 is secured, by gluing, on a plate 23, provided with bosses 24.

Figure 4:
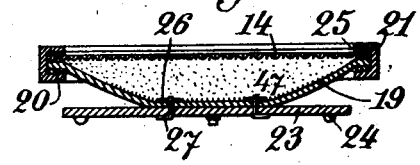
Fig. 4 is a modification of the same capsule.
Figure 2:
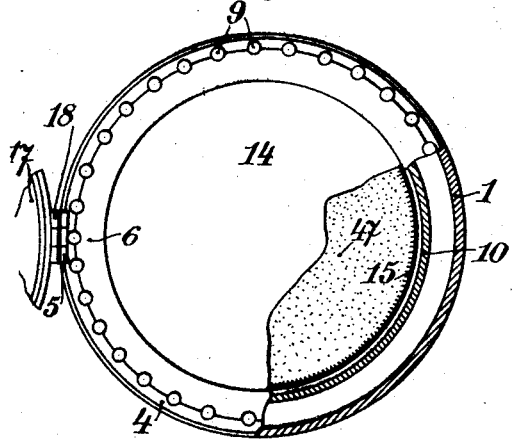
Fig. 2 is a top plan view of this box.
Figure 5:
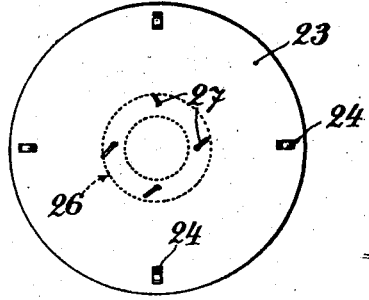
Fig. 5 is an underside plan view of the plate on which is secured the supple bottom of the interchangeable capsule.

In Fig. 4, the sieve is mounted on a thin frame 25, made of cardboard for instance, this facilitating the placing in position of the sieve in the ring 21, upon beading.

The middle portion of the supple bottom 19 is secured on the plate 23, by means of a ring 26 and of lugs 27 which pass through the skin and the plate 23, under which they are bent down.

Figure 6:
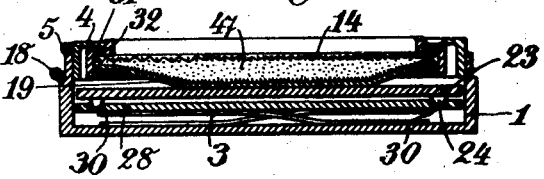
Fig. 6 is a vertical section of a box enclosing a powder capsule, the sieve of which is moved by means of a puff.

In Fig. 6, the capsule is placed in a box having a body 1, and provided at its upper part with the frame 4 hingedly mounted at 5; the clamping ring 31 is provided with a raised portion 32 which serves as a support for the puff placed on the sieve 14; this raised portion 32 allows the puff to move the ring 31, which has a diameter slightly smaller than the interior of the hinged frame 4.

The movable skin bottom 19 being secured on the plate 23 only by its central portion, the suppleness of the skin allows the displacement of the free portions of the latter without causing any movement of the bottom connected to the plate 23; this causes a displacement of the sieve on the powder 47, which issues through the sieve 14, comes on to the puff and adheres to the same.

The plate 23 cannot move, as it is connected to the push-plate 28, provided with openings 30, in which enter the projecting parts 24; the push-plate is pushed upwardly by the spring 3 arranged at the bottom of the box 1.

Instead of the sieve being displaced to and fro, the bottom of the pocket 19 can be moved, as indicated in Fig. 7; the clamping ring 21 fits without play, in the hinged frame 4, the sieve being constituted by a metal or like plate 33, perforated with holes 34.

The plate 23 secured under the central portion of the skin pocket 19, is provided with openings 35, in which pass rods 37; these rods 37 pass also through the push-plate 28, through openings 36 and are secured on a crown 38, provided with teeth 40 with which mesh a pinion 41 mounted on the shaft 42 of an operating knob 43; the crown 38 is held to the bottom of the box by a stop 39 and by the pinion 41.

By imparting a to-and-fro movement to the operating knob 43, the crown 38 follows this movement and actuates, through the medium of the rods 37, the push-plate 28 and the plate 23 secured to the bottom of the skin pocket 19; the skin moves, drawing along in its movement the powder 47, which, by rubbing on the sieve 33, passes through the openings 34, and penetrates the puff.

Figure 9:
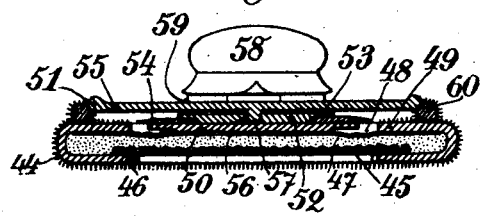
Fig. 9 is a vertical section of a puff having a movable bottom and a top constituting a handle.

Fig. 9 illustrates a puff forming a reservoir for the powder; this puff is composed of a velvet body 44 apertured at its middle portion and lined with silk stockinet 45, this stockinet being secured to the edge of the velvet by a circular seam 46.

Figure 10:
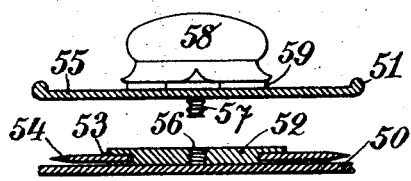
Fig. 10 is a section, made on an enlarged scale, of the interchangeable top, and of the member on which it is secured.

The powder 47, contained within the body 44, is covered at the back by a supple skin 48, on which is bent down at 49 the velvet 44, a leather or paper washer 50 is glued on to the central portion of the skin 48, and on this washer is secured a nut 52 made of aluminium or other light material; the said washer is beaded, at its periphery, on a leather piece 54 (Fig. 10), clamped in a slot 53 and glued on the washer 50.

The middle portion of the nut 52 is provided with a tapped opening 56, in which is screwed a threaded rod 57 of a movable top 55, carrying a handle 58, hingedly mounted at 59 and provided with a bead 51.

When using the puff, the movement of the same moves the skin of the bottom 48, on which the powder adheres, and it is this adherence which causes the powder to issue through the stockinet sieve 45.

Figure 11:
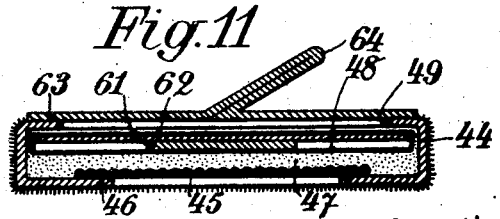
Fig. 11 is a vertical section of a modification of this type of puff.

The puff shown in Fig. 11 comprises a ring of velvet 44, in the middle of which a piece of silk stockinet is sewn by stitches 46; the powder 47 is held between the velvet and the stockinet at the front, and the supple skin 48 at the rear. A silk termining 60 secured to the velvet puff 44 masks the interval between the latter and the top 55.

The skin and the velvet 44 are bent down, at 49, on the cloth or paper washer 62 secured on a washer 61, glued on the other side on the middle portion of the skin bottom 48.

The top 63 carries a handle 64.

The case shown in Figs. 12—17 is composed of a bottom cup 65 carrying a spring 70 and a washer 71, the latter being secured under the middle portion of the supple skin pocket 19 which contains the powder 47; the pocket 19 is mounted on the frame 66 of the capsule.

A frame 67 carries the sieve 14.

A cover 68 carries a mirror 73.

All the parts 65, 66, 67 and 68 are connected by a hinge 69.

The closing of the case is ensured by a fastener 74 secured on the cover 68 by a rivet 76 passing through an opening 75 (Figs. 13-14).

The frames 67 and 66 are closed on each other by means of a spring 71.

The parts 66 and 65 are closed on each other by means of a spring 72.

The movement determining the issue of the powder 17 through the sieve 14, is imparted by a lever 77, pivoted at 78, on a rod 82 and hinged at 79 and 80 on the plate 71, these joints allowing the lever to follow the upward movement of the said plate 71.

The end of the lever passes through a cut-away portion 81 in the angle portion of the frames 66 and 67.

The filling up of this case is effected in a very simple manner; it suffices to open the frame 67 carrying the sieve 14 for releasing the supple pocket 19, which, once the frame 66 is open, forms a deep pocket, so as to facilitate insertion of the powder.

The closing of the frame 67 compresses the powder between the supple bottom 19 and the sieve 14.

The closing of the frame 66 onto the bottom 65 causes the spring 70 to exert its thrust.

By imparting a to-and-fro movement to the lever 77, the supple bottom 19 is moved, drawing along the powder, which being scraped by the sieve, issues under the puff.

The various forms of construction described and illustrated are given by way of example only and can vary to infinity without departing from the scope of the present invention.

The most varied raw materials, such as cardboard, fabric, rubber, plastic materials, metal and the like, can be used for the manufacture of the various parts above described.

Claims:

1. In a distributor for pulverulent or pasty products a capsule containing said product and having a bottom of fluid-tight, supple and rough material and an upper part serving as a sieve, means to fix together the edges of said bottom and of said sieve, means for displacing said sieve relatively to the bottom, by distorting the latter, and means to maintain said capsule in said distributor.

2. In a distributor for pulverulent or pasty products a box, in said box a capsule containing said product and having a bottom of fluid-tight, supple and rough material and an upper part serving as a sieve, means to fix together the edges of said bottom and of said sieve, means for displacing said sieve relatively to the bottom, by distorting the latter, and means to maintain said capsule in said box.

3. In a distributor for pulverulent or pasty products a box, in said box a capsule containing said product and having a bottom of fluid-tight, supple and rough material, an upper part serving as a sieve and a circular support the section of which has the form of an S, a ring beaded on the edges of the sieve to which it is secured, on those of the bottom of the capsule and on the upper edges of the circular support, relatively to which it can rotate, a spring bearing on the bottom of the box, a push plate pressed by said spring against the bottom of the capsule, means for holding the circular support stationary in the box and means for displacing the ring and the sieve relatively to the circular support and to the bottom of the capsule, by distorting the latter.

4. In a distributor for pulverulent or pasty products a box, in said box a capsule containing said product and having a bottom of fluid-tight, supple and rough material, an upper part serving as a sieve and a circular support the section of which has the form of an S, a ring beaded on the edges of the sieve to which it is secured, on those of the bottom of the capsule and on the upper edges of the circular support, relatively to which it can rotate, a spring bearing on the bottom of the box, a push plate pressed by said spring against the bottom of the capsule, bosses provided in the bottom of the cylindrical body and extending in corresponding recesses of the bottom of the box, a ring connected to the box by a hinge, a second ring folded over the first ring, capable of rotating on the same, and tightly fitting by friction on the ring secured to the sieve and means located outside the box for causing the second ring to rotate.

5. In a distributor for pulverulent or pasty products a box, in said box a capsule containing said product and having a bottom of fluid-tight, supple and rough material, an upper part serving as a sieve and a circular support the section of which has the form of an S, a ring beaded on the edges of the sieve to which it is secured, on those of the bottom of the capsule and on the upper edges of the circular support, relatively to which it can rotate, a spring bearing on the bottom of the box, a push plate pressed by said spring against the bottom of the capsule, bosses provided in the bottom of the cylindrical body and extending in corresponding recesses of the bottom of the box, a ring connected to the box by a hinge, a second ring folded over the first ring, capable of rotating on the same, and tightly fitting by friction on the ring secured to the sieve, and projections provided on the upper face of the second ring and adapted to be gripped by the fingers.

6. In a distributor for pulverulent or pasty products a box, in said box a capsule containing said product and having a bottom of fluid-tight, supple and rough material and an upper part serving as a sieve, a ring beaded on the edges of said bottom and said sieve and having an inner vertical edge, a spring bearing on the bottom of the box, a push plate pressed by said spring against the bottom of the capsule the diameter of which is equal to the inner diameter of the box, a ring connected to the box by a hinge, the inner diameter of which is smaller than the outer diameter of the other ring but greater than that of the vertical ledge of the latter, which passes through it.

7. In a distributor for pulverulent or pasty products a box, in said box a capsule containing said product and having a bottom of fluid-tight, supple and rough material and an upper part serving as a sieve, a ring beaded on the edges of said bottom and said sieve and frictionally maintained in said box, a spring bearing on the bottom of the box, a push plate pressed by said spring against the bottom of the capsule, a toothed crown rigid with the push plate, a pinion meshing with the toothed crown and controlled from the exterior.

8. In a distributor for pulverulent or pasty products a capsule containing said product and having a bottom of fluid-tight, supple and rough-material an upper part serving as a sieve and a tight body connecting the sieve and the bottom, a plate secured to the central portion of the bottom, a second plate rigid with ithe first plate and covering the bottom of the distributor, a handle connected to the second plate for displacing the sieve relatively to the bottom, by distorting the latter.

9. In a distributor for pulverulent or pasty products a box, in said box a capsule containing said product and having a bottom of fluid-tight, supple and rough material, an upper part serving as a sieve, a first ring secured to the edge of the bottom, a second ring secured to the edge of the sieve, means for assembling both rings, a spring bearing on the bottom of the box, a push plate pressed by said spring against the bottom of the capsule and means for displacing the sieve relatively to the bottom.

10. In a distributor for pulverulent or pasty products a box, in said box a capsule containing said product and having a bottom of fluid-tight, supple and rough material, an upper part serving as a sieve, a first ring secured to the edge of the bottom, a second ring secured to the edge of the sieve, a cover closing the box, a hinge connecting the cover and both rings to the box body and means for displacing the sieve relatively to the bottom.

11. In a distributor for pulverulent or pasty products, a box, in said box a capsule containing said product and having a bottom of fluid-tight, supple and rough material, an upper part serving as a sieve, a first ring secured to the edge of the bottom, a second ring secured to the edge of the sieve, a cover closing the box, a hinge connecting the cover and both rings to the box body, a spring bearing on the bottom of the box, a push plate pressed by said spring against the bottom of the capsule, a lever pivoted on an axis carried by the box body, one end of this lever being connected to the push plate, and the other end being free and accessible from the exterior when the cover is open.

In testimony whereof I have hereunto affixed my signature.

JOSEPH, EUGÈNE, BAPTISTE MAILLARD.